United States Patent
Christiansen et al.

(10) Patent No.: US 12,406,505 B2
(45) Date of Patent: Sep. 2, 2025

(54) RESIDUE SPREAD MONITORING

(71) Applicant: AGCO International GmbH, Neuhausen (CH)

(72) Inventors: Martin Peter Christiansen, Randers (DK); Ramon Buchaca Tarragona, Randers (DK); Morten Stigaard Laursen, Randers (DK); Kenneth Düring Jensen, Randers (DK); Thomas Smed Bojsen, Randers (DK)

(73) Assignee: AGCO International GmbH, Neuhausen (CH)

( * ) Notice: Subject to any disclaimer, the term of this patent is extended or adjusted under 35 U.S.C. 154(b) by 358 days.

(21) Appl. No.: 17/664,215

(22) Filed: May 19, 2022

(65) Prior Publication Data

US 2022/0375228 A1 Nov. 24, 2022

(30) Foreign Application Priority Data

May 19, 2021 (GB) ..................................... 2107127

(51) Int. Cl.
*G06V 20/56* (2022.01)
*A01C 7/08* (2006.01)
*G06T 7/50* (2017.01)
*G06V 10/44* (2022.01)

(52) U.S. Cl.
CPC .............. *G06V 20/56* (2022.01); *A01C 7/085* (2013.01); *G06T 7/50* (2017.01); *G06V 10/44* (2022.01); *G06T 2207/30188* (2013.01); *G06T 2207/30252* (2013.01)

(58) Field of Classification Search
CPC .......... G06V 20/56; G06V 10/44; G06T 7/50; G06T 2207/30188; G06T 2207/30252; A01C 7/085
See application file for complete search history.

(56) References Cited

U.S. PATENT DOCUMENTS

| 6,422,490 B1* | 7/2002 | Truan | A01C 15/18 239/677 |
| 2014/0136023 A1* | 5/2014 | Jaccoma | A01B 76/00 701/2 |
| 2018/0310474 A1* | 11/2018 | Posselius | A01D 41/127 |
| 2019/0124849 A1* | 5/2019 | Farley | A01F 12/444 |
| 2020/0037491 A1* | 2/2020 | Schoeny | A01C 21/005 |
| 2020/0407949 A1* | 12/2020 | Aizawa | E02F 9/24 |

(Continued)

FOREIGN PATENT DOCUMENTS

| DE | 102016214320 A1 | 2/2017 |
| EP | 3592130 A1 | 1/2020 |

OTHER PUBLICATIONS

UK Intellectual Property Office, Search report for related UK Application No. GB2107127.9, dated Feb. 17, 2022.

*Primary Examiner* — Andrew J Cromer

(57) ABSTRACT

Systems and methods for monitoring the distribution of residue material from a spreader tool of an agricultural machine including an imaging sensor coupled to an unloading auger of the agricultural machine used to image an area to the rear of the agricultural machine where the Image data is analysed to determine a distribution of residue material associated with the spreader tool and one or more operational parameters of the agricultural machine or components are controlled based on the determined distribution.

13 Claims, 4 Drawing Sheets

(56) References Cited

U.S. PATENT DOCUMENTS

Figure 1:
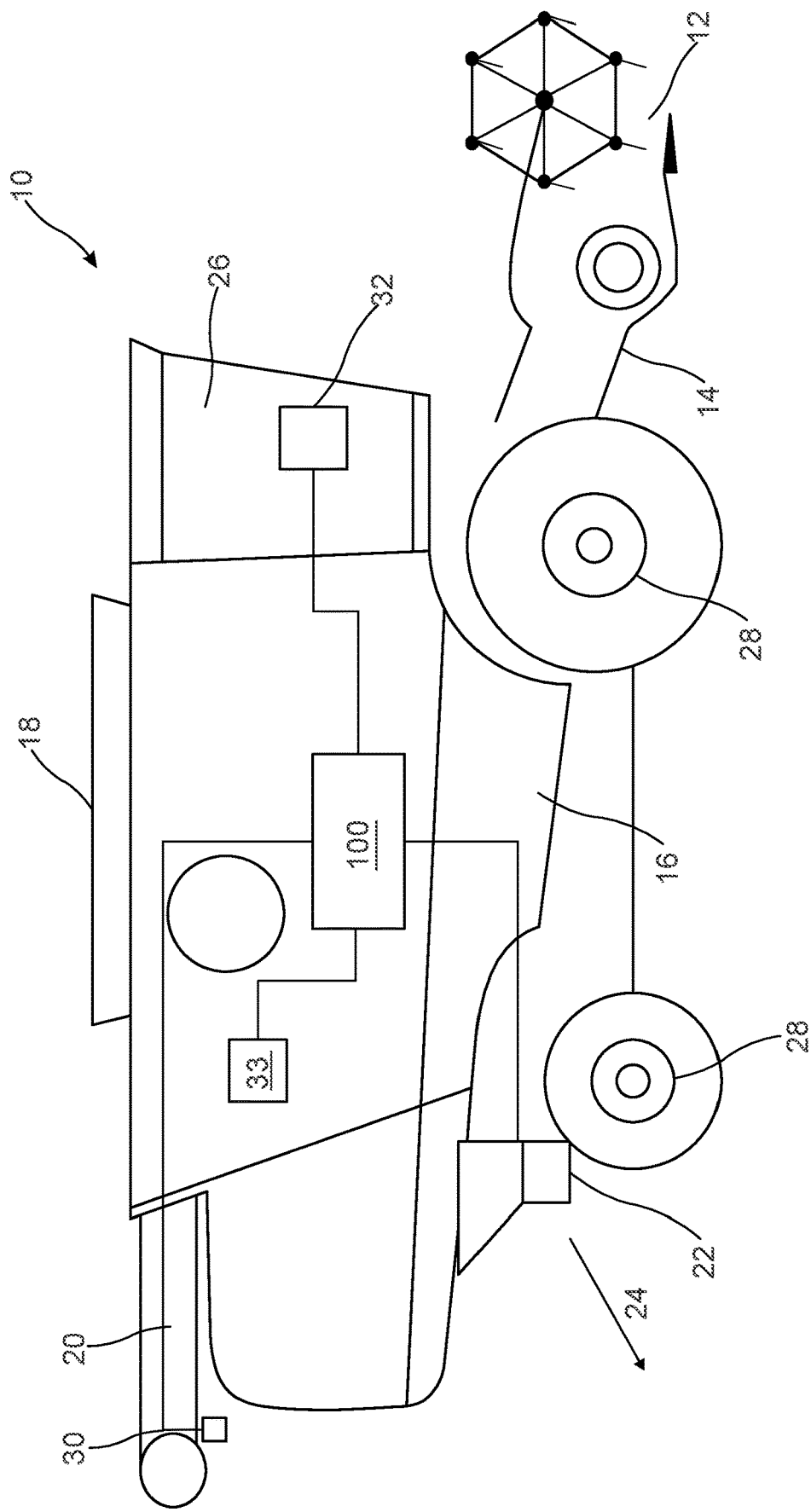

| | | |
|---|---|---|
| 2021/0084820 A1 | 3/2021 | Vandike et al. |
| 2021/0195840 A1* | 7/2021 | Puryk .................... A01D 90/10 |
| 2023/0292666 A1* | 9/2023 | Vandike ................. G05D 1/648 |
| | | 56/10.2 F |

* cited by examiner

RESIDUE SPREAD MONITORING

TECHNICAL FIELD

The present invention relates, in general, to systems and methods for monitoring residue spread from a harvesting machine.

BACKGROUND

Agricultural combines work to cut crop material from a field before separating the grain from the material other than grain (MOG) (referred to interchangeably as "residue") on board. Generally, the grain is transferred to a grain bin of the combine (where it may be temporarily stored) and the MOG is deposited back onto the field. A second operation may be performed to gather the deposited MOG, or the MOG may be used as a fertiliser for the soil in the field. In either case, it is important for the MOG to be distributed evenly during deposition, in order to ensure an efficient second harvesting operation (e.g. bailing of the MOG) or to ensure effective fertilisation of the soil. When residue is unevenly distributed over a field, not only are exposed areas at risk for erosion, but inconsistencies in soil temperatures and moisture also may cause uneven plant emergence the following year, hurting yield. Ideally, residue should be spread consistently and managed to promote uniform rapid warming and drying in the spring for earlier planting and sufficient seed germination. It is also important not to spread MOG or residue into standing crop adjacent to the machine—i.e. the crop to be harvested on the next pass by the machine—as spreading into standing crop may result in the same area being spread twice causing an unwanted built of residue in a given area, again leading to uniformity issues.

To control the distribution of the MOG, known combines include spreader tools which can include deflectors/steering vanes, fans or the like which are controllable by an operator of the combine. Generally, this is a manual process and the operator must observe the distribution of the MOG during operation and make any necessary adjustments to the spreader tool manually. The distribution of the MOG can be affected by numerous operating conditions, including wind speed, water content of the material, gradient of the field, etc. Accordingly, observing and adjusting the spreader tool manually can be relatively complex and time consuming, especially where the operating conditions vary across the area to be harvested.

In an attempt to address this problem it is known to utilise sensors, e.g. wind direction sensors, ultrasonic sensors, cameras and the like operable to infer or monitor the distribution of the MOG in real time. In some instances, information relating to the observed distribution may be relayed to the operator of the combine (e.g. through a user interface within the operator cab) who may use this information to adjust operation of the spreader tool. In further solutions, control of the spreader tool has been at least partly automated based on data from such sensors, for example by controlling the direction of one or more steering vanes/deflectors in an attempt to account for wind direction. However, such systems are relatively complex and no complete solution has been realised.

It would be advantageous to improve upon these known systems such that the distribution of material from an agricultural machine can be monitored and optionally controlled more effectively and efficiently.

SUMMARY OF THE INVENTION

In an aspect of the invention there is provided a system for monitoring the distribution of residue material from a spreader tool of an agricultural machine, the system comprising: an imaging sensor mounted or otherwise coupled to an unloading auger of the agricultural machine, and having a sensing region rearwards of the agricultural machine; and one or more controllers, configured to: receive image data from the sensor indicative of residue material spread by the spreader tool within the sensing region; analyse the image data to determine a distribution of residue material associated with the spreader tool; and output one or more control signals for controlling one or more operational parameters of the agricultural machine or one or more components thereof in dependence on the determined distribution.

The imaging sensor is advantageously mounted or otherwise coupled to the unloading auger which, in a non-use position, may overhang the rear of the agricultural machine providing a generally "top-down" sensing region rearwards of the agricultural machine. The unloading auger may be moveable, and as such, the present invention may advantageously make use of the mobility of the auger to adjust the position of the imaging sensor where necessary or desirable. The imaging sensor may also have a secondary use in such a setup, specifically where the auger is in an "in-use" position, e.g. positioned over a collection vehicle for transferring gathered crop material to the collection vehicle, and the imaging sensor may be used to monitor that process also.

The system may comprise or may be communicably coupled to an inertial measurement unit (IMU). The IMU may be mounted or otherwise coupled to the agricultural machine, for example on the unloading auger of the machine or as part of a sensing unit incorporating the imaging sensor. The IMU may provide information relating to an orientation/pose of the agricultural machine and/or the sensing unit. The one or more controllers may be configured to determine the residue distribution in dependence on data received from the IMU. For instance, the one or more controllers may be configured to determine an orientation of the machine relative to a horizontal ground surface and determine the distribution in dependence thereon, e.g. by applying an appropriate image correction/transformation to the image data.

The one or more controllers may be operable to control a position of the auger. For example, the one or more controllers may be operable to output one or more control signals for controlling a position of the auger relative to the rear of the agricultural machine. In effect, the one or more controllers may be operable to control a position of the imaging sensor relative to the rear of the combine through controlling movement of the auger. This may be advantageous where an adjustment in the field of view of the imaging sensor might overcome or at least mitigate external factors, including obscuring of the sensing region either physically or light obscuring (shadows, glare, etc.).

The one or more controllers may be configured to control a position of the auger in dependence on orientation information obtained from the IMU. It may be advantageous to move the auger to a position whereby it is positioned directly above the outlet of the spreader tool. Where the agricultural machine is operating on substantially flat ground this may not require any movement of the imaging sensor, however, where the machine is operating on a slope resulting in the machine being tilted in some manner to the left or right, for instance, it may be necessary to move the auger (and hence the sensor) with respect to a lateral axis of the machine to position the imaging sensor back above the spreader tool.

The one or more controllers may be configured to analyse the image data from the imaging sensor through a feature extraction process, analysing the image data to identify one or more features including boundaries or edges in the image data (e.g. a step in pixel value across multiple adjacent pixels), or certain shapes in the image data corresponding to an expected shape and size of residue material in images obtained by the imaging sensor. The one or more controllers may be configured to determine, from the extracted features, the position of one or more of: a standing crop boundary, a boundary between spread residue material and the background, e.g. the ground surface onto which the material is being spread; and/or at least part of the agricultural machine within the images obtained by the imaging sensor.

The one or more controllers may be configured to determine, from the analysis of the image data, one or more characteristics of the observed residue distribution. The one or more controllers may be configured to control the one or more operational parameters of the machine (or components) in dependence on the determined characteristic(s). The one or more characteristics of the residue material distribution may include a shape of the distribution. The one or more characteristics of the residue material distribution may include a skew of the distribution. The skew may comprise a relative measure of an amount of residue material in one or more sub-regions of the sensing region of the imaging sensor. This may include a relative measure of an amount of residue material left or right of a centreline located substantially centrally along a longitudinal axis of the machine. The one or more characteristics of the residue material distribution may include a distance at which the residue material is spread. This may include a distance from the spreader tool at which the residue material is spread. The one or more characteristics of the residue material distribution may include a maximum lateral extent of residue material spread by the spreader tool. The one or more characteristics of the residue material distribution may include a density of material across the residue material distribution. The one or more characteristics of the residue material distribution may include a measure of the uniformity of the residue material distribution across the width (or at least part of the width) of the distribution.

The imaging sensor preferably comprises a camera. The imaging sensor may incorporate a lens providing an equidistance projection. In some embodiments the lens may instead provide a perspective projection.

In embodiments, the one or more systems of the agricultural machine controllable by the system of the present aspect may include a user interface, e.g. a display means, which may provide information, for example to an operator of the agricultural machine corresponding to the determined distribution. This may comprise visually illustrating the observed distribution, or providing an audible or visual indicator to the operator of the observed residue distribution. For example, the user interface may be operable to or be instructed by the one or more controllers (e.g. through control signals output by the one or more controllers) to display or otherwise indicate an error state when the observed residue distribution differs from a predetermined state (which may be user selected). For example, an operator may select a desired relative distribution of the residue material, e.g. 50/50 split between the left hand side and right hand side of the agricultural machine, and the system may be configured to output an indicator if the observed distribution differs from the desired distribution, or differs from the desired distribution by a predetermined amount.

In further embodiments, the system may be operable to control one or more operating parameters of the agricultural machine in dependence on the determined distribution. The one or more operating parameters may include operating parameters of the spreader tool.

The spreader tool may include a steering mechanism, and the system may be operable to control one or more operating parameters of the steering mechanism to control the distribution of residue material from the spreader tool. For example, the steering mechanism may include one or more steering vanes or deflectors, and the system may be operable to control a position (e.g. a rotational position) of the steering vane(s) or deflector(s) to control a direction of deflection therefrom.

The steering mechanism may include a first steering unit for controlling the distribution of residue material from the spreader tool in a first direction. The steering mechanism may include a second steering unit for controlling distribution of residue material from the spreader tool in a second direction. The first and second directions may correspond to a left hand side and a right hand side of the agricultural machine.

The steering mechanism may include one or more rotors operable to provide a motive force for the residue material through the steering mechanism. For example, the rotor(s) may provide or induce an airflow through the steering mechanism, or may be operable to provide the motive force through contacting the residue material with one or more moveable elements of the rotor—e.g. a rotatable element. The steering mechanism may comprise a first steering unit in the form of a first rotor for controlling movement of residue material through and out of the steering mechanism in generally the first direction and/or a second steering unit in the form of a second rotor for controlling movement of residue material through and out of the steering mechanism in generally the second direction. The system may be operable to control operation of the first and/or second rotor (e.g. a first operating parameter of the spreader tool may relate to the operation of the first rotor and a second operating parameter of the spreader tool may relate to the operation of the second rotor), for example, by controlling a rotational speed of the first and/or second rotor to control distribution of residue material in the first and/or second directions. It will be appreciated that the speed at which the rotors operate may be used to control the extent to which the residue material is distributed from the spreader tool. Accordingly, the system may be operable to control a speed of the first and/or second rotors (e.g. a rotational speed of a rotatable element of the rotor(s). For example, the system may be operable to increase the speed of the first rotor to increase a distance at which the residue material is distributed in the first direction. Likewise, the system may be operable to increase the speed of the second rotor to increase a distance at which the residue material is distributed in the second direction. The system may be operable to decrease the speed of the first and/or second rotor to decrease a distance at which the residue material is distributed in the first/second direction.

In an aspect of the invention there is provided a control system for monitoring the distribution of residue material from a spreader tool of an agricultural machine, the control system comprising one or more controllers, and being configured to: receive image data from an imaging sensor mounted or otherwise coupled to an unloading auger of the agricultural machine, and having a sensing region rearwards of the agricultural machine, the image data being indicative of residue material spread by the spreader tool within the sensing region; analyse the image data to determine a distribution of residue material associated with the spreader tool; and output one or more control signals for controlling one or more operational parameters of the agricultural machine or one or more components thereof in dependence on the determined distribution.

The one or more controllers may collectively comprise an input (e.g. an electronic input) for receiving one or more input signals indicative of the image data from the imaging sensor. The one or more controllers may collectively comprise one or more processors (e.g. electronic processors) operable to execute computer readable instructions for controlling operation of the control system, for example to analyse the image data and determine the residue material distribution therefrom. The one or more processors may be operable to generate one or more control signals for controlling the one or more operational parameters. The one or more controllers may collectively comprise an output (e.g. an electronic output) for outputting the one or more control signals.

The one or more controllers of the control system may be configured in any manner of the one or more controllers of the system described hereinabove with reference to the first aspect of the invention.

According to another aspect of the invention there is provided an agricultural machine comprising the system or control system of any preceding aspect.

Optionally, the agricultural machine may comprise a harvesting vehicle, such as a combine harvester, for example.

In a further aspect of the invention there is provided a method of monitoring the distribution of residue material from a spreader tool of an agricultural machine, comprising: receiving, from an imaging sensor mounted or otherwise coupled to an unloading auger of the agricultural machine, and having a sensing region rearwards of the agricultural machine, image data indicative of residue material spread by the spreader tool within the sensing region; analysing the image data to determine a distribution of residue material associated with the spreader tool; and controlling one or more operational parameters of the agricultural machine or one or more components thereof in dependence on the determined distribution.

The method may comprise determining an orientation or pose of the agricultural machine and/or the imaging sensor, for example, using information received from an IMU mounted or otherwise coupled to the sensor or agricultural machine. The method may comprise determining the residue distribution in dependence on data received from the IMU. For instance, method may comprise determining an orientation of the machine relative to a horizontal ground surface and determining the distribution in dependence thereon, e.g. by applying an appropriate image correction/transformation to the image data.

The method may comprise controlling a position of the auger. For example, the method may comprise controlling a position of the auger relative to the rear of the agricultural machine. The method may comprise controlling a position of the auger in dependence on orientation information obtained from the IMU.

The method may comprise analysing the image data from the imaging sensor through a feature extraction process, analysing the image data to identify one or more features including boundaries or edges in the image data (e.g. a step in pixel value across multiple adjacent pixels), or certain shapes in the image data corresponding to an expected shape and size of residue material in images obtained by the imaging sensor. The method may comprise determining, from the extracted features, the position of one or more of: a standing crop boundary, a boundary between spread residue material and the background, e.g. the ground surface onto which the material is being spread; and/or at least part of the agricultural machine within the images obtained by the imaging sensor.

The method may comprise determining, from the analysis of the image data, one or more characteristics of the observed residue distribution. The method may comprise controlling the one or more operational parameters of the machine (or components) in dependence on the determined characteristic(s). The one or more characteristics of the residue material distribution may include a shape of the distribution. The one or more characteristics of the residue material distribution may include a skew of the distribution. The skew may comprise a relative measure of an amount of residue material in one or more sub-regions of the sensing region of the imaging sensor. This may include a relative measure of an amount of residue material left or right of a centreline located substantially centrally along a longitudinal axis of the machine. The one or more characteristics of the residue material distribution may include a distance at which the residue material is spread. This may include a distance from the spreader tool at which the residue material is spread. The one or more characteristics of the residue material distribution may include a maximum lateral extent of residue material spread by the spreader tool. The one or more characteristics of the residue material distribution may include a density of material across the residue material distribution. The one or more characteristics of the residue material distribution may include a measure of the uniformity of the residue material distribution across the width (or at least part of the width) of the distribution.

In embodiments, the one or more systems controlled include a user interface, e.g. a display means, which may provide information, for example to an operator of the agricultural machine corresponding to the determined distribution. This may comprise visually illustrating the observed distribution, or providing an audible or visual indicator to the operator of the observed residue distribution. For example, the user interface may be used to display or otherwise indicate an error state when the observed residue distribution differs from a predetermined state (which may be user selected). For example, an operator may select a desired relative distribution of the residue material, e.g. 50/50 split between the left hand side and right hand side of the agricultural machine, and the method may include outputting an indicator if the observed distribution differs from the desired distribution, or differs from the desired distribution by a predetermined amount.

In further embodiments, the method may include controlling one or more operating parameters of the agricultural machine in dependence on the determined distribution. The one or more operating parameters may include operating parameters of the spreader tool. The method may include controlling one or more operating parameters of a steering mechanism of the spreader tool to control the distribution of residue material from the spreader tool. For example, the steering mechanism may include one or more steering vanes or deflectors, and the position (e.g. a rotational position) of the steering vane(s) or deflector(s) may be controlled to control a direction of deflection therefrom.

The steering mechanism may include a first steering unit for controlling the distribution of residue material from the spreader tool in a first direction. The steering mechanism may include a second steering unit for controlling distribution of residue material from the spreader tool in a second direction. The first and second directions may correspond to a left hand side and a right hand side of the agricultural machine.

The steering mechanism may include one or more rotors operable to provide a motive force for the residue material through the steering mechanism. For example, the rotor(s) may provide or induce an airflow through the steering mechanism, or may be operable to provide the motive force through contacting the residue material with one or more moveable elements of the rotor—e.g. a rotatable element. The steering mechanism may comprise a first steering unit in the form of a first rotor for controlling movement of residue material through and out of the steering mechanism in generally the first direction and/or a second steering unit in the form of a second rotor for controlling movement of residue material through and out of the steering mechanism in generally the second direction. The method may include controlling operation of the first and/or second rotor (e.g. a first operating parameter of the spreader tool may relate to the operation of the first rotor and a second operating parameter of the spreader tool may relate to the operation of the second rotor), for example, by controlling a rotational speed of the first and/or second rotor to control distribution of residue material in the first and/or second directions. It will be appreciated that the speed at which the rotors operate may be used to control the extent to which the residue material is distributed from the spreader tool. Accordingly, the method may include controlling a speed of the first and/or second rotors (e.g. a rotational speed of a rotatable element of the rotor(s). For example, the increasing the speed of the first rotor may increase a distance at which the residue material is distributed in the first direction. Likewise, increasing the speed of the second rotor may increase a distance at which the residue material is distributed in the second direction. Decreasing the speed of the first and/or second rotor may decrease a distance at which the residue material is distributed in the first/second direction.

In a further aspect of the invention there is provided computer software comprising computer readable instructions which, when executed by one or more processors, causes performance of the method of the preceding aspect of the invention.

A further aspect of the invention provides a computer readable storage medium comprising the computer software of the preceding aspect of the invention. Optionally, the storage medium comprises a non-transitory computer readable storage medium.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

One or more embodiments of the invention will now be described, by way of example only, with reference to the accompanying drawings, in which:

FIG. 1 is a schematic side cross-sectional view of an agricultural harvester embodying aspects of the invention;

FIG. 2 is a schematic view of an embodiment of a control system of the invention;

FIGS. 3A and 3B are schematic views of the rear of the combine illustrating an operational use of aspects of the invention; and FIG. 4 is a schematic view illustrating image data obtained using aspects of the invention.

DETAILED DESCRIPTION

FIG. 1 illustrates an agricultural machine, and specifically a combine 10, embodying aspects of the present invention.

The combine 10 is coupled to a header 12 which is operable, in use, to cut and gather a strip of crop material as the combine 10 is driven across a field/area to be harvested during a harvesting operation. A conveyor section 14 conveys the cut crop material from the header 12 into a crop processing apparatus 16 operable to separate grain and non-grain (i.e. material other than grain (MOG) or residue material (used interchangeably herein)) as will be appreciated. It is noted here that apparatus for separating grain and non-grain material are well-known in the art and the present invention is not limited in this sense. The skilled person will appreciate that numerous different configurations for the crop processing apparatus may be used as appropriate. Clean grain separated from the cut crop material is collected in a grain bin 18, which may be periodically emptied, e.g. into a collection vehicle, storage container, etc. utilising unloading auger 20. The remaining non-grain material (MOG)/residue material is separately moved to a spreader tool 22 which is operable in use to eject the non-grain material or MOG from the rear of the combine 10 and onto the ground. In FIG. 1, this is represented by arrow 24 which illustrates the MOG being ejected rearwards from the combine 10. It will be appreciated that in some embodiments the combine 10 may also include a chopper tool positioned, for example, between the crop processing apparatus 16 and the spreader tool 22 and operable, in use, to cut the residue material before it is spread by the spreader tool 22.

The combine 10 also typically includes, amongst other features, an operator cab 26, wheels 28, engine (not shown) and a user interface 32.

As will be discussed in detail herein, the combine 10 additionally includes an imaging sensor in the form of a camera 30. The camera 30 is mounted on the underside of the unloading auger 20 and is used, by a control system 100 of the combine, to determine one or more characteristics of a distribution of residue material associated with the spreader tool 22 in the manner discussed herein.

FIG. 2 illustrates control system 100 further. As shown, control system 100 comprises a controller 102 having an electronic processor 104, an electronic input 106 and electronic outputs 108, 110. The processor 104 is operable to access a memory 112 of the controller 102 and execute instructions stored therein to perform the steps and functionality of the present invention discussed herein, e.g. by controlling the user interface 32, for example to provide an image or an indicator to an operator of the combine 10 illustrative of the observed residue material distribution.

The processor 104 is operable to receive sensor data via input 106 which, in the illustrated embodiment, takes the form of input signals 105 received from the camera 30. As described in detail herein, the camera 30 has a sensing region rearward of the combine 10, with the sensor data received from the camera 30 being indicative of a residue material within the sensing region.

Using this information, the processor 104 is operable to determine residue material distribution in the manner described herein. Specifically, the processor 104 is operable to analyse the image data received from the camera 30 to identify one or more residue material pieces and/or one or more characteristic(s) of the residue distribution within the image data. Based on this, control over one or more systems of the combine 10 is performed, as described herein.

The processor 104 is also operable to receive data via input 106 from an inertial measurement unit (IMU) 33 in the form of data signals 113. The data from the IMU 33 may be used as discussed herein to determine an orientation of the combine 10 relative to a horizontal surface and use this to determine the distribution in dependence thereon.

Figure 2:
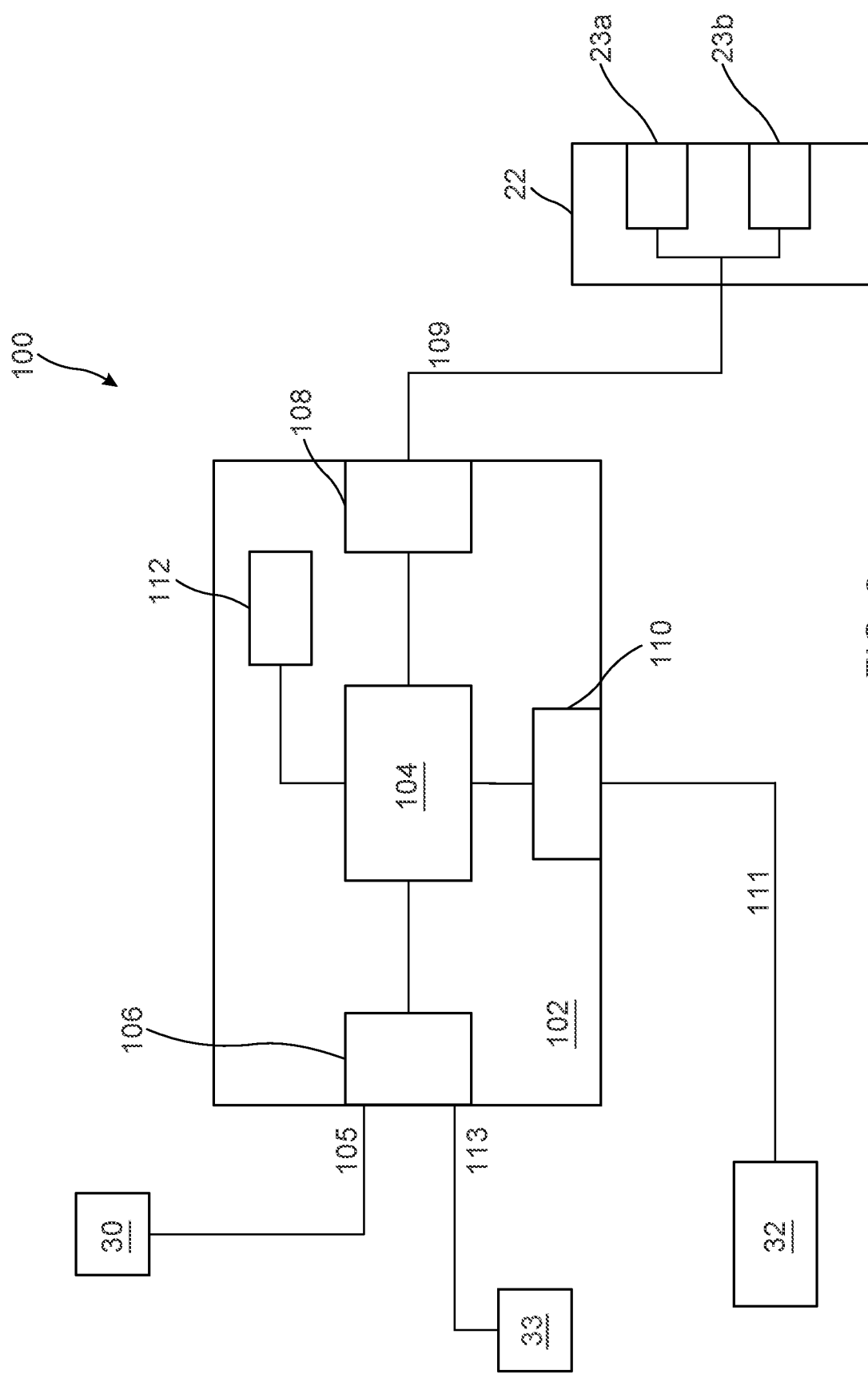

In the illustrated embodiment of FIG. 2, output 110 is operably coupled to the user interface 32 of the combine 10. Here, the control system 100 is operable to control operation of the user interface 32, e.g. through output of control signals 111 in order to display operational data to an operator of the combine 10 relating to the operation of the control system 100. Specifically, the control system 100 may be operable to control the user interface 32 to display to the operator a graphical representation of the residue material distribution from the spreader tool 22 as determined by processor 104, image data obtained from the camera 30, or other useful information, including a representation of one or more determined characteristic(s) of the distribution (see below). The user interface 32 may also be operable to receive a user input from the operator, and in such instances the output 110 may act as an input for receiving that user input at the processor 104. The user input may relate to a requested or desired distribution of residue material, for example, made by the operator of the combine 10.

In a variant, as illustrated by FIGS. 1 and 2, the processor 104 is operable to generate and output control signals 109 via the output 108 for controlling operation of the spreader tool 22, and more specifically first and second steering units of the spreader tool 22, here in the form of a first rotor 23a and a second rotor 23b, for controlling the distribution of residue material ejected from the spreader tool 22 in dependence on the determined distribution.

Figure 3A:
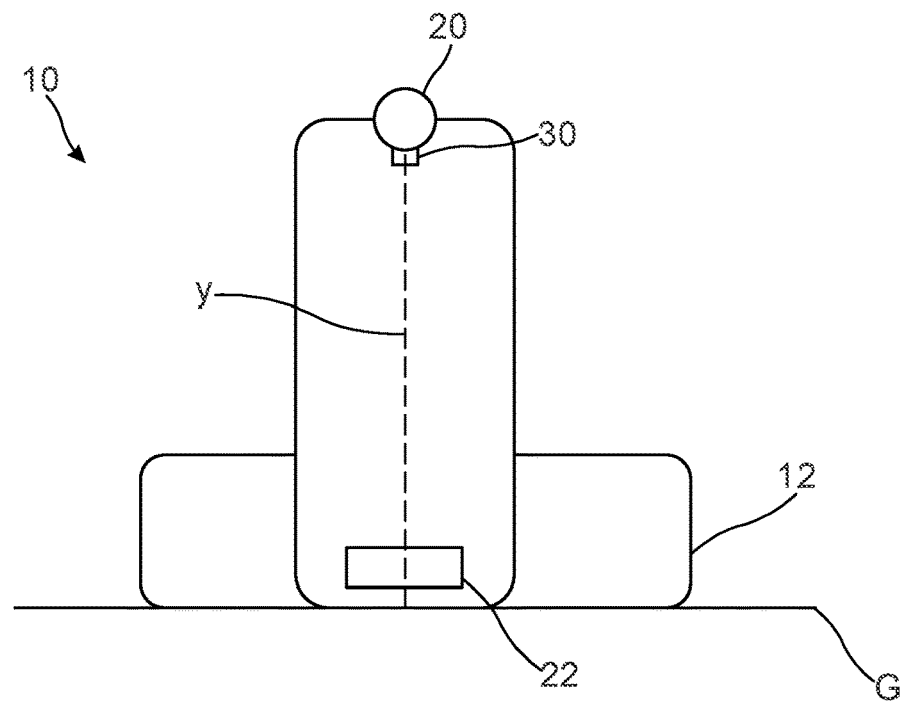
Figure 3B:
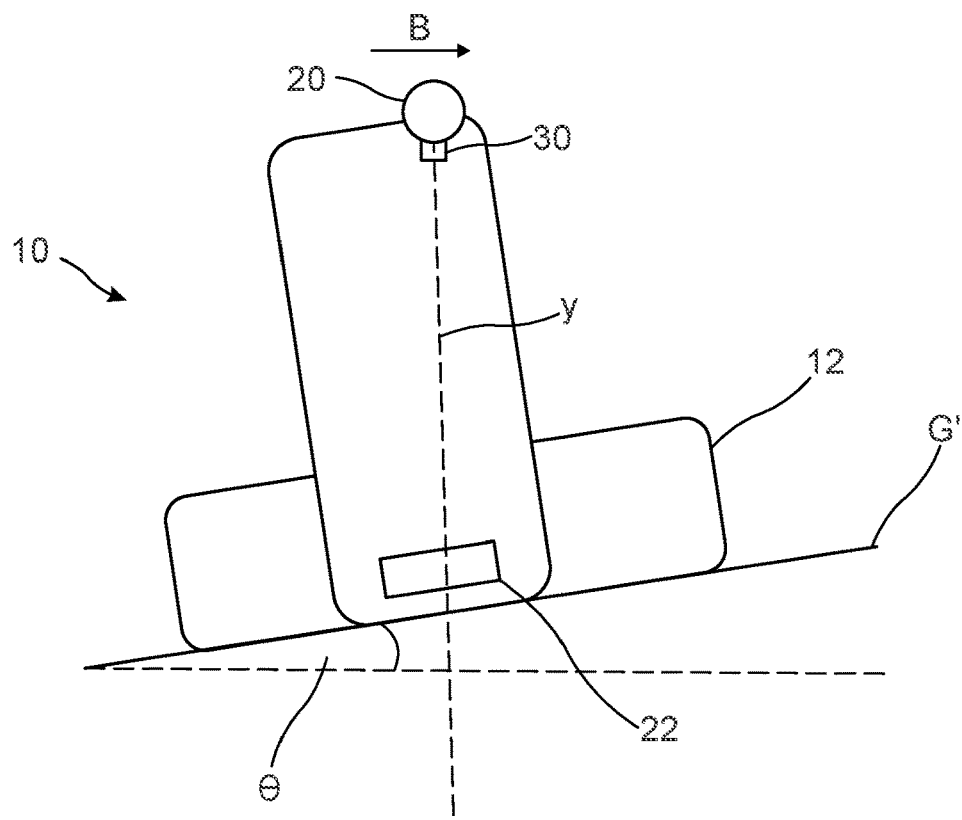
Figure 4:
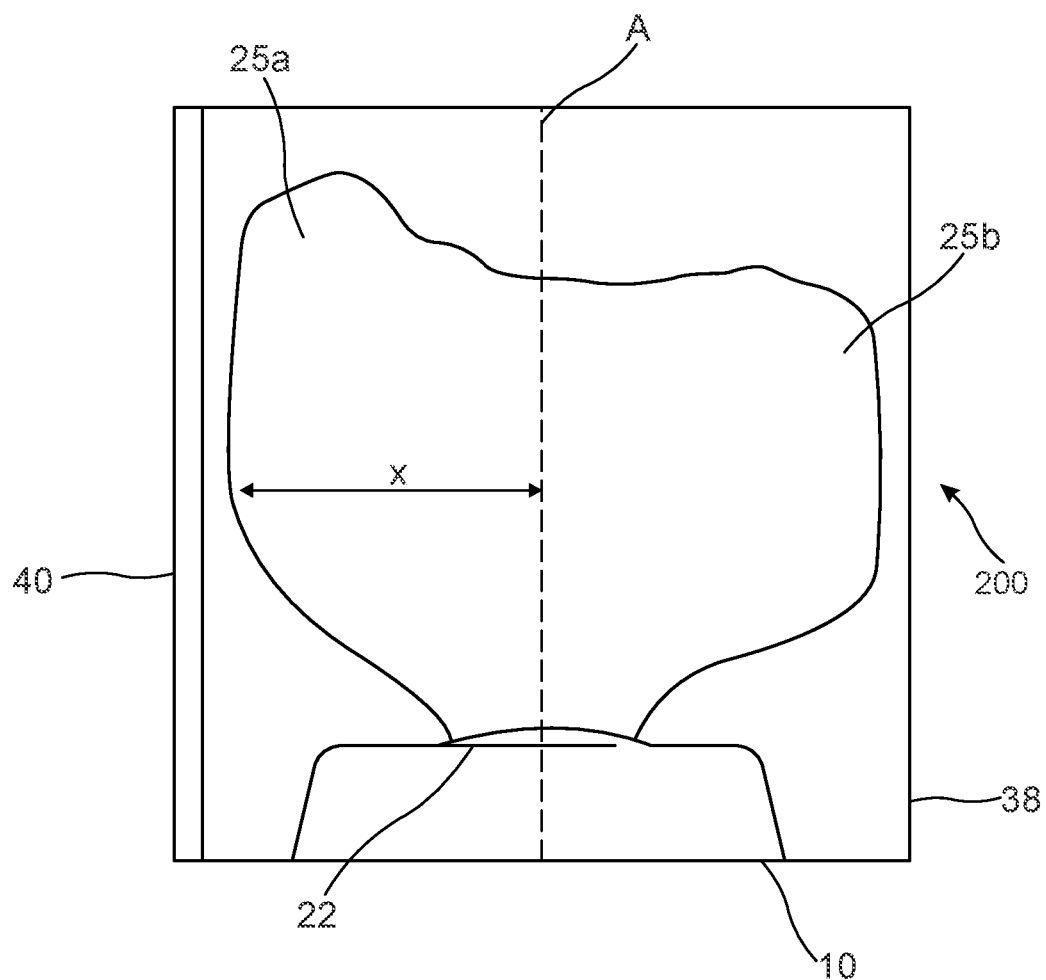

FIGS. 3A, 3B and 4 illustrate the operational use of aspects of the invention.

FIGS. 3A and 3B are schematic views of the rear of combine 10. In FIG. 3A, combine 10 is shown on a relatively flat ground surface G, with camera 30 positioned substantially directly above spreader tool 22, as illustrated by vertical axis Y. This is considered to be an optimum position for the camera 30 in this scenario to give a field of view of the camera 30 which encompasses either side of the combine 10 equally, or at least either side of the spreader tool 22. In FIG. 3B, the combine 10 is positioned on a ground surface which is angled with respect to a horizontal axis, here by angle θ. As shown, with auger 20 (and hence camera 30) positioned in the same place as in FIG. 3A, the camera 30 would no longer be positioned vertically above an outlet of the spreader tool 22. Rather, the present invention advantageously utilises information from the IMU 33 (not shown in FIGS. 3A and 3B) for determining the angle θ and thereby make a corresponding adjustment to the position of the auger 20 (and hence camera 30) to position the camera substantially vertically above the outlet of the spreader tool 22. This is indicated in FIG. 3B by moving the auger 20 in the direction illustrated by arrow "B".

In an extension of the present invention, the auger 20 may be moved to move the position of the camera 30 relative to the spreader tool 22 for other reasons, including to overcome obstructions in the image data obtained of the sensing region. This can include physical obstructions, e.g. overhanging crop or other vegetation, components of the combine 10, etc. intruding on the images obtained by the camera 30, or visual obstructions including glare on the camera 30, or shadows covering at least part of the sensing region. The position of the auger 20 may be advantageously moved to adjust the camera 30 position to account for such conditions.

FIG. 4 illustrates a sample image 200 obtained through use of the camera 30, and is used here to illustrate an operational use of aspects of the invention.

The processor 104 comprises an image processing module configured to analyse, using a feature extraction process, the image 200 obtained by the camera 30 to identify different regions within the image 200. Here, this includes classifying each pixel of the image 200 based on a classifier corresponding to a value of the pixel. The invention is not limited in this sense, but preferably includes either an RGB value or greyscale value, depending on the camera type used. In the illustrated embodiment, the processor 104 is configured to classify each pixel into one of four different categories including a "Residue" category" where the pixel value is deemed to be indicative of the presence of material at that point in the image data, a "Ground" category for pixel values indicative of a ground surface over which the machine is travelling, a "Vehicle" or "Machine" category for pixel values indicative of the presence of at least part of the agricultural machine (or components thereof) in the image data, and an "Other" category for pixel values which do not fall within expected pixel values for each of the other categories making up the classification. FIG. 4 illustrates image 200 which has been analysed with pixels classified to form image data with an area of residue material 25 (split here into 25a and 25b— discussed herein), a ground surface 38, vehicle 10 and adjacent standing crop 40 classified as "Other".

With the individual pixels classified by the processor 104, the classified image data is further analysed to identify one or more features including boundaries or edges in the image data (e.g. a boundary between different areas of classifications), or certain shapes in the image data corresponding to an expected shape and size of residue material in images obtained by the camera 30.

With the processed image data, the processor 104 is configured to determine one or more characteristics of the observed residue material distribution. FIG. 4 illustrates multiple different characteristics which may be determined from the image 200.

For instance, the processor 104 may be configured to determine an indication of the shape of the distribution.

The processor 104 may be operable to determine a skew of the distribution. Here, the skew comprises a relative measure of an amount of residue material in each of two sub-regions 25a, 25b of the sensing region of the camera 30, and specifically sub regions 25a, 25b of the area within the image 200 classified as residue material. This includes a relative measure of an amount of residue material left or right of a centreline "A" located substantially centrally along a longitudinal axis of the combine 10. In image 200 the residue distribution is shown to be skewed towards the left-hand side (in the orientation shown in FIG. 4).

The processor 104 may be operable to determine a distance at which the residue material is spread. Illustrated in FIG. 4, a maximum lateral extent of residue material spread by the spreader tool 22 is determined, shown by distance "x", and specifically in the direction of an adjacent standing crop boundary 40. As discussed herein, preferable for residue material not to be spread into adjacent standing crop, but to be ejected to a maximum lateral distance which coincides with the standing crop boundary 40. Accordingly, processor 104 is configured to determine this distance such that appropriate actions can be taken to control the spreader tool 22 accordingly.

Using the one or more determined characteristics, such as those discussed above, the processor 104 may compare these with reference data, for instance to determine whether any corrective actions might be required. The reference data can include information indicative of an expected characteristic or characteristics for a given set of one or more operational parameters of the combine (or components thereof), and is preferably a learned model trained on a set of training images of known residue distributions for varying operating conditions, generated and/or retrieved for any given set of operating conditions through a deep learning network, with the one or more operating conditions used as inputs to the network, and the output being the reference data, which may include the expected distribution characteristics as discussed herein.

In one embodiment, the reference data comprises a reference image or reference representation of an expected skew for the residue distribution for a given set of operating parameters (including one or more of a forward speed of the agricultural machine, an operating speed of the spreader tool, an operating speed of one or more sub-systems of the machine, including one or more of a cleaning system or grain sorting system of the machine, an operational speed of an implement attached or otherwise coupled to the machine, including a header, and a conveyor speed of one or more grain transport systems on the machine, etc., or one or more external conditions, including a weather condition, temperature, wind speed and direction, and the like, for example). This may preferably be a "zero" skew image, with an equal or substantially equal split of residue between left and right sides of the combine 10. In another embodiment, the reference data comprises a reference image or reference representation of an expected maximum lateral extent for the residue distribution for a given set of operating parameters.

Based on the above analysis, the processor 104 is configured to control operation of one or more systems of the combine 10 to result in an adjustment of the residue distribution (if necessary). As discussed above, this includes control over the user interface 32 to provide information to an operator of the agricultural machine corresponding to the determined characteristic(s). This can visually illustrating the observed distribution, for example providing a representation similar to image 200 of FIG. 4. This could include providing an audible or visual indicator to the operator of the observed residue distribution or characteristic(s). For example, the user interface 32 may be used to display or otherwise indicate an error state when the observed residue distribution differs from the reference data and hence requires the attention of the operator, e.g. to prompt the operator to take one or more corrective actions (change in operational parameters of one or more systems of the combine 10) to adjust the distribution.

The processor 104 is additionally operable to control one or more operating parameters of the combine 10 in dependence on the determined characteristic(s), and specifically operating parameters of the spreader tool 22, to automate correction/adjustment of the parameters to achieve the desired/expected characteristic(s) of the residue distribution. As an example, the processor 104 may be configured to determine if the residue material distribution is skewed left or right, or is substantially uniform, e.g. in the manner discussed above. It may be that the residue material is determined to be skewed to the left (as shown in FIG. 4) and appropriate action may be taken based thereon. For example, control signals 109 may be output via electronic output 108 to spreader tool 22, and specifically to first and second rotors 23a, 23b of the spreader tool to adjust operation thereof, e.g. to reduce the speed of the left rotor 23a and/or increase the speed of the right rotor 23b, or in some instances adjust the orientation of one or more steering vanes (not shown) to reduce the skewedness of the residue distribution profile—essentially by increasing the volume of material ejected generally to the left (into the region 25a of residue shown in FIG. 4) and/or reduce the volume of material ejected generally to the right—region 25b.

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as set out herein and a machine readable storage storing such a program. Still further, embodiments of the present invention may be conveyed electronically via any medium such as a communication signal carried over a wired or wireless connection and embodiments suitably encompass the same.

It will be appreciated that the above embodiments are discussed by way of example only. Various changes and modifications can be made without departing from the scope of the present application.

The invention claimed is:

1. A system for monitoring the distribution of residue material from a spreader tool of an agricultural machine, the system comprising:
   an imaging sensor mounted or otherwise coupled to an unloading auger of the agricultural machine, and having a sensing region rearwards of the agricultural machine;
   an inertial measurement unit (IMU) either mounted or otherwise coupled to the agricultural machine; and
   at least one controller, configured to:
      position the auger vertically above an outlet of the spreader tool;
      receive orientation data from the inertial measurement unit (IMU) reflective of an orientation of the agricultural machine;
      adjust a position of the auger relative to the agricultural machine in dependence on the orientation data to adjust at least one of a position or an orientation of the imaging sensor and to keep the auger positioned vertically above the outlet of the spreader tool;

receive image data from the sensor indicative of residue material spread by the spreader tool within the sensing region;

analyze the image data to determine a distribution of residue material associated with the spreader tool; and output at least one control signal for controlling at least one operational parameter of the agricultural machine or at least one component of the machine based on the determined distribution.

2. The system of claim 1, comprising or otherwise communicably coupled to an inertial measurement unit (IMU) either mounted or otherwise coupled to the agricultural machine.

3. The system of claim 2, wherein the at least one controller is configured to determine the residue distribution based on data received from the IMU.

4. The system of claim 3, wherein the at least one controller is configured to determine an orientation of the imaging sensor relative to ground surface and determine the distribution based on the determined orientation.

5. The system of claim 1, wherein the at least one controller is operable to control a position of the auger.

6. The system of claim 1, wherein the at least one controller is configured to analyze the image data from the imaging sensor through a feature extraction process and identify at least one feature comprising boundaries or edges in the image data, certain shapes in the image data corresponding to an expected shape, and size of residue material in the image data.

7. The system of claim 1, wherein the at least one controller is configured to determine, from the analysis of the image data, at least one characteristic of the residue distribution.

8. The system of claim 7, wherein the at least one controller is configured to control the at least one operational parameter or component of the machine based on the at least one determined characteristic.

9. The system of claim 7, wherein the at least one characteristic of the distribution of residue material comprises:
   a shape of the distribution;
   a skew of the distribution;
   a distance from the spreader tool at which the residue material is spread;
   a maximum lateral extent of residue material spread by the spreader tool;
   a density of material across the distribution of residue material; and
   a measure of uniformity of the distribution of residue material across a width, or part of the width, of the distribution.

10. The system of claim 1, wherein the at least one operational parameter or component of the agricultural machine controllable by the system comprises a user interface which provides information corresponding to the determined distribution.

11. The system of claim 1, operable to control at least one operating parameter of the agricultural machine based on the determined distribution, wherein the at least one operational parameter comprises at least one operating parameter of the spreader tool.

12. An agricultural machine comprising the system of claim 1.

13. A method of monitoring the distribution of residue material from a spreader tool of an agricultural machine, comprising:
   positioning an unloading auger of the agricultural machine vertically above an outlet of the spreader tool, the auger having an imaging sensor mounted or otherwise coupled to the unloading auger of the agricultural machine and having a sensing region rearwards of the agricultural machine;
   receiving orientation data from an inertial measurement unit (IMU) either mounted or otherwise coupled to the agricultural machine;
   adjusting a position of an unloading auger in dependence on the orientation data to adjust at least one of a position or an orientation of the imaging sensor and to keep the auger positioned vertically above the outlet of the spreader tool;
   receiving, image data from an imaging sensor, wherein the image data is indicative of residue material spread by the spreader tool within the sensing region;
   analyzing the image data to determine a distribution of residue material associated with the spreader tool; and
   controlling at least one operational parameter or component of the agricultural machine based on the determined distribution.

* * * * *